United States Patent
Camenisch et al.

(10) Patent No.: US 10,560,274 B2
(45) Date of Patent: Feb. 11, 2020

(54) CREDENTIAL-BASED AUTHORIZATION

(71) Applicant: International Business Machines Corporation, Armonk, NY (US)

(72) Inventors: Jan Camenisch, Thalwil (CH); Daniel Kovacs, Adliswil (CH); Kai Samelin, Rueschlikon (CH); Dieter M. Sommer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 15/177,391

(22) Filed: Jun. 9, 2016

(65) Prior Publication Data

US 2017/0359184 A1   Dec. 14, 2017

(51) Int. Cl.
*H04L 9/32*   (2006.01)
*H04L 9/30*   (2006.01)
*H04L 9/14*   (2006.01)
*H04L 29/06*   (2006.01)

(52) U.S. Cl.
CPC .............. *H04L 9/3263* (2013.01); *H04L 9/14* (2013.01); *H04L 9/30* (2013.01); *H04L 63/0823* (2013.01); *H04L 63/108* (2013.01)

(58) Field of Classification Search
CPC . H04L 9/14; H04L 9/30; H04L 9/3263; H04L 9/3265; H04L 9/3268; H04L 63/0823; H04L 63/10
USPC ................................. 713/156; 726/1–5, 7, 10
See application file for complete search history.

(56) References Cited

U.S. PATENT DOCUMENTS

| | | | |
|---|---|---|---|
| 5,699,431 A | 12/1997 | Van Oorschot et al. | |
| 6,044,462 A | 3/2000 | Zubeldia et al. | |
| 6,216,231 B1* | 4/2001 | Stubblebine | G06F 21/33 |
| | | | 713/156 |
| 6,230,266 B1* | 5/2001 | Perlman | H04L 9/3268 |
| | | | 713/156 |
| 6,775,782 B1 | 8/2004 | Buros et al. | |

(Continued)

FOREIGN PATENT DOCUMENTS

JP   2008011098 A *   1/2008   ............. G06F 21/64

OTHER PUBLICATIONS

Camenisch, Jan, et al, "D2.1 Architecture for Attribute-based Credential Technologies—Version 1", Attribute-Based Credentials for Trust, Jan. 12, 2011, 105 pgs.

(Continued)

*Primary Examiner* — Samson B Lemma
(74) *Attorney, Agent, or Firm* — Harrington & Smith

(57) ABSTRACT

Methods and systems are provided for demonstrating authorization to access a resource to a verifier computer controlling access to the resource. The method comprises, at a user computer, storing an attribute credential certifying a set of attributes; and communicating with a revocation authority computer to obtain an auxiliary credential, bound to the attribute credential, certifying a validity status for each attribute in the attribute credential. The method further comprises, at the user computer, communicating with the verifier computer to prove possession of the attribute credential and the auxiliary credential such that the verifier computer can determine whether at least one attribute in the attribute credential, certified as valid by the auxiliary credential, satisfies an access condition for the resource.

18 Claims, 3 Drawing Sheets

(56) References Cited

U.S. PATENT DOCUMENTS

| | | | | |
|---|---|---|---|---|
| 6,883,100 | B1* | 4/2005 | Elley | G06F 21/6218 |
| | | | | 726/5 |
| 7,143,286 | B2* | 11/2006 | Brown | G06F 21/64 |
| | | | | 713/156 |
| 7,213,262 | B1* | 5/2007 | Elley | G06F 21/6218 |
| | | | | 709/229 |
| 7,543,139 | B2 | 2/2009 | Camenisch et al. | |
| 7,581,107 | B2 | 8/2009 | Camenisch | |
| 7,904,722 | B2* | 3/2011 | Sudia | G06Q 20/401 |
| | | | | 713/156 |
| 8,423,764 | B2 | 4/2013 | Amendola et al. | |
| 8,839,381 | B2 | 9/2014 | Nguyen et al. | |
| 2002/0073310 | A1 | 6/2002 | Benantar | |
| 2002/0194471 | A1 | 12/2002 | Benantar et al. | |
| 2006/0075222 | A1* | 4/2006 | Moloney | H04L 63/0823 |
| | | | | 713/156 |
| 2006/0156391 | A1 | 7/2006 | Salowey | |
| 2008/0016335 | A1* | 1/2008 | Takahashi | H04L 9/3263 |
| | | | | 713/156 |
| 2014/0281525 | A1* | 9/2014 | Acar | H04L 9/3213 |
| | | | | 713/168 |
| 2015/0280924 | A1* | 10/2015 | Camenisch | H04L 9/3221 |
| | | | | 713/155 |
| 2015/0381373 | A1 | 12/2015 | Camenisch et al. | |
| 2017/0134350 | A1* | 5/2017 | Kravitz | H04L 63/061 |

OTHER PUBLICATIONS

"Internet X.509 Public Key Infrastructure Certificate Policy and Certification Practices Framework" (http://www.ietf.org/rfc/rfc2527.txt).

Jan Camenisch and Els Van Herreweghen "Design and Implementation of the Idemix Anonymous Credential System" IBM Research, Zurich Research Laboratory.

Christian Paquin and Greg Zaverucha "U-Prove Cryptographic Specification V1.1 Revision 3" Microsoft Corporation, Dec. 2013. (http://research.microsoft.com/apps/pubs/default.aspx?id=166969).

Shivaramakrishnan Narayan, Martin Gagne, and Reihaneh Safavi-Naini "Privacy Preserving EHR System Using Attribute-based Infrastructure" Department of Computer Science, University of Calgary, Alberta, Canada.

Jan Camenisch, Maria Dubovitskaya, Anja Lehmann, Gregory Neven, Christian Paquin, and Franz-Stefan Preiss "Concepts and Languages for Privacy-Preserving Attribute-Based Authentication" IBM Research-Zurich Microsoft Research.

David W. Chadwick, Alexander Otenko, Edward Ball "Role-Based Access Control with X.509 Attribute Certificates" University of Salford.

http://www.certificate-transparency.org [retrieved Apr. 19, 2018].

Jan Camenisch, Markulf Kohlweiss, and Claudio Soriente. Solving revocation with efficient update of anonymous credentials. In Juan A. Garay and Roberto De Prisco, editors, Security and Cryptography for Networks, 7th International Conference, SCN 2010, Ama;fi, Italy, Sep. 13-15, 2010. Proceedings, vol. 6280 of Lecture Notes in Computer Science, pp. 454-471. Springer Sep. 2010.

Jolyon Clulow and Tyler Moore. Suicide for the common good: a new strategy for credential revocation in self-organizing systems. Operating System Review, 40(3): Jul. 18-21, 2006.

* cited by examiner

CREDENTIAL-BASED AUTHORIZATION

BACKGROUND

The present invention relates generally to credential-based authorization in computer systems, and more particularly to authorization of user computers based on attribute credentials to gain access to resources controlled by verifier computers.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Cryptographic credentials are widely used in computer systems to prove that a user in possession of the credential is authorized to access some resource to which access is controlled by a verifier computer. A cryptographic credential is essentially a certificate generated via a cryptographic process by a credential issuing authority who has verified the information certified by the credential. This information is cryptographically encoded in the credential to certify correctness of the information. The items of information certified by a credential are commonly referred to as "attributes". An attribute can represent any item of information, relating, for instance, to some property, characteristic, quality, role, qualification, or other feature describing or otherwise associated with a user or user computer. The user computer storing the attribute credential can then use the credential in communications with a verifier computer to demonstrate authorization to access a restricted resource, and in particular that one or more attributes in the credential satisfy the access condition for the resource. One common example is where a user computer connects to a remote server via the Internet and requests requesting access to a restricted web site, with verification of an appropriate cryptographic credential being required before access is permitted.

Credential systems must allow for revocation of credentials so that a previously-issued credential cannot be used if the information certified is no longer correct. In standardized systems, a credential is either completely revoked or valid. Typically, a dedicated revocation authority manages revocation of credentials. The revocation authority publishes revocation information which allows revoked credentials to be identified. The revocation information may, for example, comprise a list of revoked credential IDs. Verifiers can then check the latest revocation information to make sure that that a credential presented by a user in an access request is still valid.

SUMMARY

This section is intended to include examples and is not intended to be limiting.

According to an embodiment of the present invention, a method for demonstrating authorization to access a resource to a verifier computer controlling access to the resource is provided. The method comprises, at a user computer, storing an attribute credential certifying a set of attributes; and communicating with a revocation authority computer to obtain an auxiliary credential, bound to the attribute credential, certifying a validity status for each attribute in the attribute credential. The method further comprises, at the user computer, communicating with the verifier computer to prove possession of the attribute credential and the auxiliary credential such that the verifier computer can determine whether at least one attribute in the attribute credential, certified as valid by the auxiliary credential, satisfies an access condition for the resource.

According to another embodiment of the invention, a computer program product is provided, the computer program product comprising a computer readable storage medium embodying program instructions executable by a user computer to cause the user computer to perform the foregoing method. In another embodiment of the invention a system for authorizing access to a resource is provided, the system comprising a verifier computer which controls access to the resource, a user computer adapted to perform the foregoing method, and a revocation authority computer which is adapted to generate the auxiliary credential and to send the auxiliary credential to the user computer.

Embodiments of the invention are described in more detail below, by way of illustrative and non-limiting example, with reference to the accompanying drawings.

DETAILED DESCRIPTION

Figure 1:
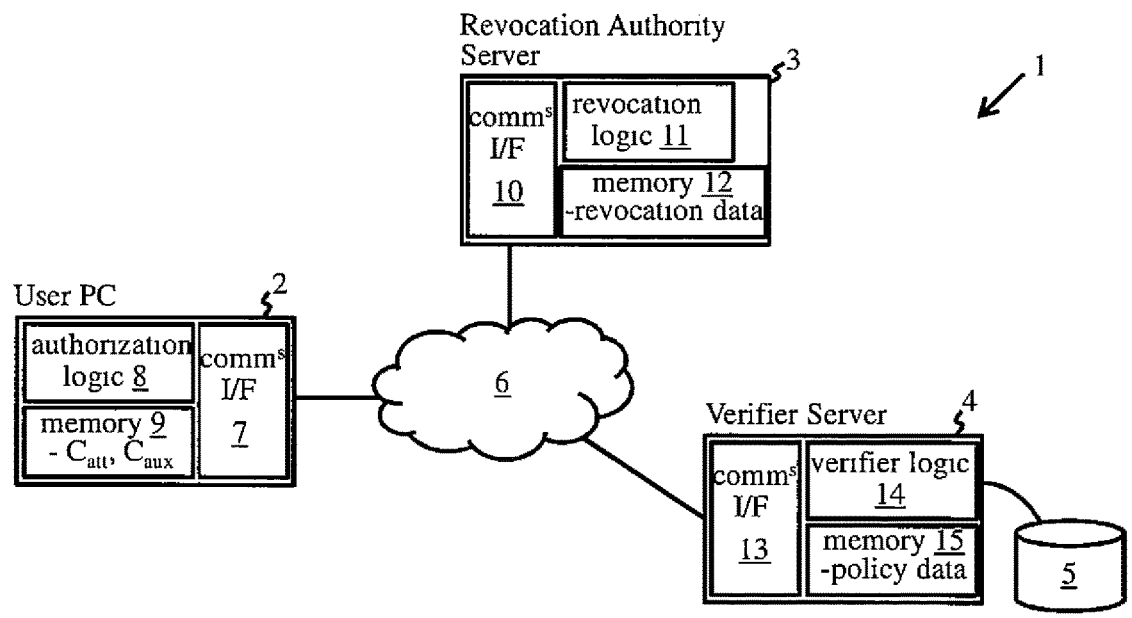
FIG. 1 is a schematic illustration of a computer system in which authorization methods embodying the invention may be implemented.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a schematic block diagram of an non-limiting exemplary computer system 1 for implementing authorization methods embodying the invention. The system 1 includes a user computer 2, in this example a general-purpose user PC (personal computer) 2, and a revocation authority computer, here a server 3 operated by a trusted Revocation Authority. System 1 further includes a verifier computer, here a server 4, which controls access to a resource, in this example a database 5. User PC 2 is operable to communicate with revocation authority (RA) server 3 and verifier server 4 via a network 6. Network 6 may in general comprise one or more component networks and/or internetworks, including the Internet, and may include wired and/or wireless network links. Access to database 5 may be requested by user PC 2 by connecting to verifier server 4 via network 6. Permission to access the database is dependent on a credential-based authorization process detailed below. In this process, user PC 2 must demonstrate possession of a cryptographic attribute credential certifying one or more attributes which satisfy a verifier-defined access condition. It must also be demonstrated in this process that the required attributes are currently valid, i.e. have not been revoked. In exemplary embodiments, the validity status of attributes in attribute credentials is attested via auxiliary credentials issued by RA computer 3.

A high-level abstraction of functional components of the computers 2, 3 and 4 is shown in FIG. 1. User PC 2 is indicated as comprising a communications interface (I/F) 7 for communications via network 6, authorization logic 8 providing functionality for implementing steps of the authorization scheme to be described, and memory 9 for storing data used by logic 8 in operation of the authorization scheme. This data includes cryptographic credentials $C_{att}$ and $C_{aux}$ defined below, and typically includes further data such as cryptographic keys, security parameters for cryptographic protocols etc., which may be required for cryptographic operations. RA server 3 is similarly indicated as comprising a communications interface 10 for communications via network 6, revocation logic 11, and memory 12. Revocation logic 12 provides functionality for issuing auxiliary credentials, and maintaining revocation data relating to validity status of attributes, as discussed further below. Memory 12 stores data used by revocation logic 12 in operation, including the revocation data for credentials and any cryptographic keys, security parameters etc., used by logic 11 in operation. Verifier server 4 is also shown as comprising a communications interface 13 for communications via network 6, verifier logic 14 providing functionality for implementing steps of the authorization scheme to be described, and memory 15. Memory 15 stores access policy data, defining the access condition for database 5, together with cryptographic keys, security parameters etc., used by logic 14 in operation.

Figure 2:
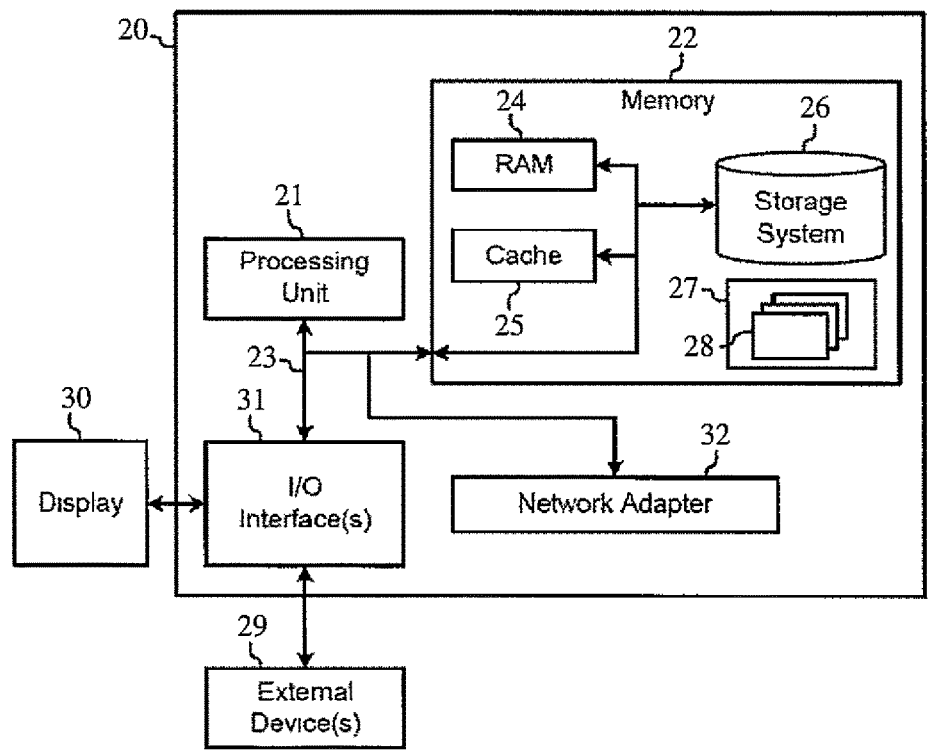
FIG. 2 is a generalized schematic of a computer in the FIG. 1 system.

In general, the logic 8, 11 and 14 of computers 2, 3 and 4 may be implemented by hardware or software or a combination thereof, and each of the functional blocks of computers 2, 3 and 4 in FIG. 1 may be implemented by one or more functional components. The logic 8, 11 and 14 may be described in the general context of computer system-executable instructions, such as program modules, executed by a computing apparatus. Generally, program modules may include routines, programs, objects, components, logic, data structures, and so on that perform particular tasks or implement particular abstract data types. FIG. 2 is a block diagram of exemplary computing apparatus for implementing a computer of system 1. The computing apparatus is shown in the form of a general-purpose computer 20. The components of computer 20 may include processing apparatus such as one or more processors represented by processing unit 21, a system memory 22, and a bus 23 that couples various system components including system memory 22 to processing unit 21.

Bus 23 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 20 typically includes a variety of computer readable media. Such media may be any available media that is accessible by computer 20 including volatile and non-volatile media, and removable and non-removable media. For example, system memory 22 can include computer readable media in the form of volatile memory, such as random access memory (RAM) 24 and/or cache memory 25. Computer 20 may further include other removable/non-removable, volatile/non-volatile computer system storage media. By way of example only, storage system 26 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 23 by one or more data media interfaces.

Memory 23 may include at least one program product having one or more program modules that are configured to carry out functions of embodiments of the invention. By way of example, program/utility 27, having a set (at least one) of program modules 28, may be stored in memory 22, as well as an operating system, one or more application programs, other program modules, and program data. Each of the operating system, one or more application programs, other program modules, and program data, or some combination thereof, may include an implementation of a networking environment. Program modules 28 generally carry out the functions and/or methodologies of embodiments of the invention as described herein.

Computer 20 may also communicate with: one or more external devices 29 such as a keyboard, a pointing device, a display 30, etc.; one or more devices that enable a user to interact with computer 20; and/or any devices (e.g., network card, modem, etc.) that enable computer 20 to communicate with one or more other computing devices. Such communication can occur via Input/Output (I/O) interfaces 31. Also, computer 20 can communicate with one or more networks such as a local area network (LAN), a general wide area network (WAN), and/or a public network (e.g., the Internet) via network adapter 32. As depicted, network adapter 32 communicates with the other components of computer 20 via bus 23. It should be understood that although not shown, other hardware and/or software components could be used in conjunction with computer 20. Examples include, but are not limited to: microcode, device drivers, redundant processing units, external disk drive arrays, RAID systems, tape drives, and data archival storage systems, etc.

In operation of system 1, the authorization process requires possession by user PC 2 of an attribute credential $C_{att}$. The credential $C_{att}$ certifies a set of (one or more) attributes which may be associated with user PC 2 and/or a user thereof. Common attribute examples include names, date of birth, nationality, profession, role in an organization etc., for users, and ID, serial number, platform configuration, etc. for user computers. In general, however, attributes may represent any item of information about which proof may need to be presented to a verifying entity. Attribute credentials can be issued in any known manner by a credential issuing authority which verifies the attribute(s) in question and encodes the attribute(s) in the credential to certify correctness of the information. Such a credential typically comprises a cryptographic signature by the issuing authority I under its own private (secret) key $sk_I$ of a public/private cryptographic key pair $(sk_I, pk_I)$. The signature can be authenticated by verifying entities using the issuer's public key $pk_I$. Attributes may be defined in credentials in various ways, typically by data tan attribute type (e.g. country of residence) and an attribute value (e.g. Switzerland). Credentials can be supplied by the issuing authority via various mechanisms, for instance, by transmitting via a data communications channel to a user computer 2, e.g. via network 6 in FIG. 1, by an issuing authority computer, or may be stored on some information storage device, such as a smart card, which is supplied to the user and can be operatively coupled to user computer 2, e.g. via a card-reader. Particular examples of attribute credentials may include: certificates used in X.509 credential systems (see e.g. Internet X.509 Public Key Infrastructure, http://www.ietf.org/rfc/rfc2527.txt); the privacy-preserving attribute-based credentials used in IBM Corporation's Identity Mixer anonymous credential system (see e.g. "Design and implementation of the idemix anonymous credential system", Jan Camenisch, Els Van Herreweghen, ACM CCS 2002: 21-30); and the tokens used in Microsoft Corporation's U-Prove credential system (see e.g. U-Prove Cryptographic Specification V1.1 (Revision 3), Christian Paquin and Greg Zaverucha, http://research.microsoft.com/apps/pubs/default-.aspx?id=166969). However, the particular type of attribute credential, and its manner of issue, is orthogonal to the authorization operation to be described. It suffices to understand that an attribute credential to be used as a basis for authorization has been previously issued and stored in memory operatively associated with user computer 2.

Figure 3:
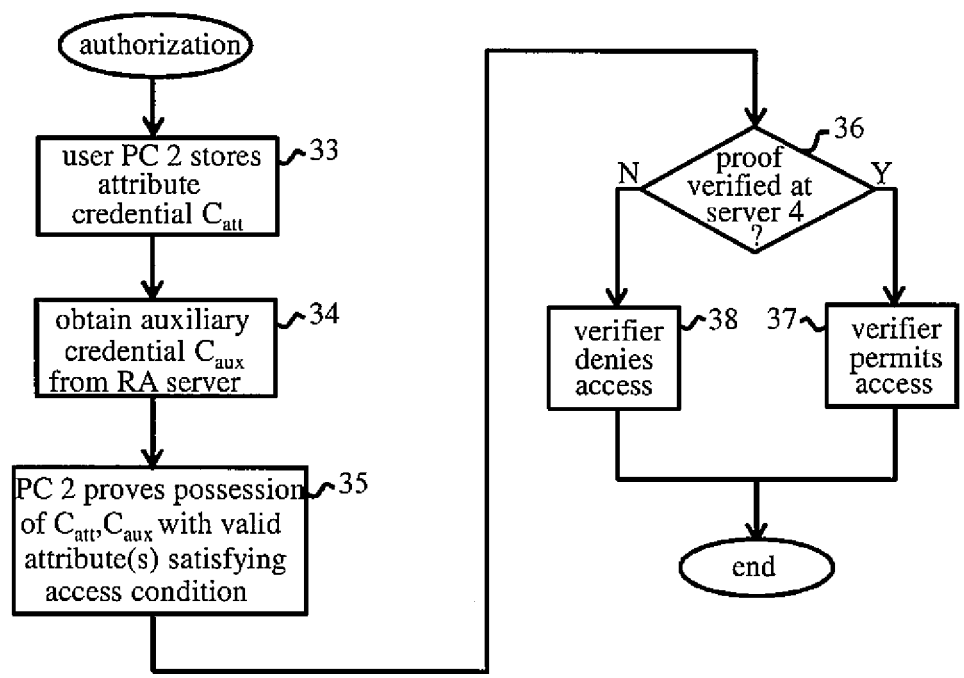
FIG. 3 indicates steps performed by a user computer in operation of the FIG. 1 system.

After issue of an attribute credential, any attribute certified by the credential can be revoked if necessary by notifying the revocation authority accordingly. Attributes may need to be revoked for numerous reasons, e.g. when users' personal details or professional roles change, qualifications and permits are acquired or rescinded, device attributes change, and so on. For each attribute credential issued for use in the authorization system, the RA server 3 maintains revocation data from which the validity status of each attribute in the credential (i.e. attribute valid or attribute revoked) can be determined. The revocation data can be implemented in various ways to enable validity status of attributes to be determined, and particular examples will be described below. This revocation data can be updated by revocation logic 11 of RA server 3 in response to notification of changes in attribute validity, e.g. from the credential issuer I or other trusted authority. In the authorization process to be described, authorization based on attribute credentials is dependent on demonstration that the required attribute(s) are still valid according to the revocation data held by RA server 3. FIG. 3 gives an overview of the authorization process indicating key steps performed in operation of system 1.

FIG. 3 indicates steps required to demonstrate authorization of user PC 2 to access database 5 via verifier server 4. As indicated by step 33, memory 9 of user PC 2 stores an attribute credential $C_{att}$ obtained from a credential issuer I as described above. In step 34 of the authorization process, the authorization logic 8 of user PC 2 communicates with RA server 3 via network 6 to obtain an auxiliary cryptographic credential $C_{aux}$. The auxiliary credential Ca, certifies, for each attribute in the attribute credential $C_{att}$ held by user PC 2, a validity status indicating whether that attribute is valid or invalid (revoked) according to the revocation data held by RA server 3. The auxiliary credential is generated by revocation logic 12, e.g. as a cryptographic signature by the revocation authority RA under its own private key $sk_{RA}$ of a public/private key pair $(sk_{RA}, pk_{RA})$. Validity status can be indicated in various ways, and the auxiliary credential can be issued and supplied to user PC2 at various times and in a variety of ways as discussed further below. However, the auxiliary credential $C_{aux}$ is bound to the attribute credential $C_{att}$ such that the auxiliary credential $C_{aux}$ can only be validly used with the corresponding attribute credential $C_{att}$. Cryptographic binding is well known in the art and can be implemented in various ways, typically by encoding some common value or related values in the two credentials, e.g. values derived from the same secret key of a party to the authorization system as explained below. In any case, the auxiliary credential $C_{aux}$ generated by revocation logic 11 is sent via communications interface 10 of RA server 3 to the user PC 2. The auxiliary credential is received by authorization logic 8 of the user PC 2 via communications interface 7 and stored in memory 9 in step 34.

In step 35, user PC 2 communicates with verifier server 4, via network 6 and communications interfaces 7 and 13, requesting access to database 5. In this communication, the authorization logic 8 of PC 2 demonstrates authorization to access the database to verifier logic 14 of server 4. In particular, authorization logic 8 proves possession of the attribute credential $C_{att}$ and the auxiliary credential $C_{aux}$ such that the verifier logic 14 can determine whether at least one attribute in the attribute credential $C_{att}$, certified as valid by the auxiliary credential $C_{aux}$, satisfies the access condition defined by the policy data in server memory 15. This proof can be made in various ways depending on the particular credential scheme and cryptographic protocols underlying the authorization system. In some systems, authorization logic 8 may send the credentials $C_{att}$, $C_{aux}$ to verifier logic 14 which then verifies that the access condition is satisfied. In preferred systems, authorization logic 8 receives from verifier server 4 an access policy message which indicates the access condition. The authorization logic 8 then implements a cryptographic proof protocol to prove to the verifier server that at least one attribute in the attribute credential is certified as valid by the auxiliary credential and satisfies the access condition. This proof protocol may be an interactive protocol, involving steps performed by both authorization logic 8 and verifier logic 14, and may or may not require credentials $C_{att}$, $C_{aux}$ to be revealed to verifier logic 14. In preferred embodiments below, authorization logic 8 implements a non-interactive proof protocol, generating a cryptographic proof Π which is then sent to verifier server 4. This proof Π demonstrates that at least one attribute in the attribute credential is certified as valid by the auxiliary credential and satisfies the specified access condition. Depending on the credential system, such a proof Π may be a zero-knowledge proof, i.e. a proof which reveals no more about the credentials and attributes than that which is required to be proved, and does not require credentials themselves to be revealed to the verifier.

In step 36 of FIG. 3, logic 14 of verifier server 4 verifies whether the access condition is satisfied based on the proof made by authorization logic 8 in step 35. If so, as indicated by a "Yes" (Y) at decision step 36, then verifier logic 14 permits user PC 2 to access to database 5 in step 37, and the authorization process is complete. If not, as indicated by a "No" (N) at decision step 36, then the verifier logic 14 denies access in step 38 and may notify user PC 2 accordingly.

The above process provides a flexible and efficient credential-based authorization scheme. Through use of the auxiliary credential $C_{aux}$, attributes in a credential $C_{att}$ can be revoked individually, leaving others still valid, without requiring re-issue of the attribute credential as a whole. The issue of attribute credentials is a relatively complex procedure due to the checks inherent in this process, and may not always be feasible, e.g. in the case of ID cards issued by a government entity. The above system provides a convenient mechanism for revocation with attribute granularity. Validity of revoked attributes can also be restored if required by simple re-issue of auxiliary credentials as discussed below.

Moreover, the verifier is not required to interact with revocation authority in the authorization process, i.e. to check revocation information for credentials.

Figure 4:
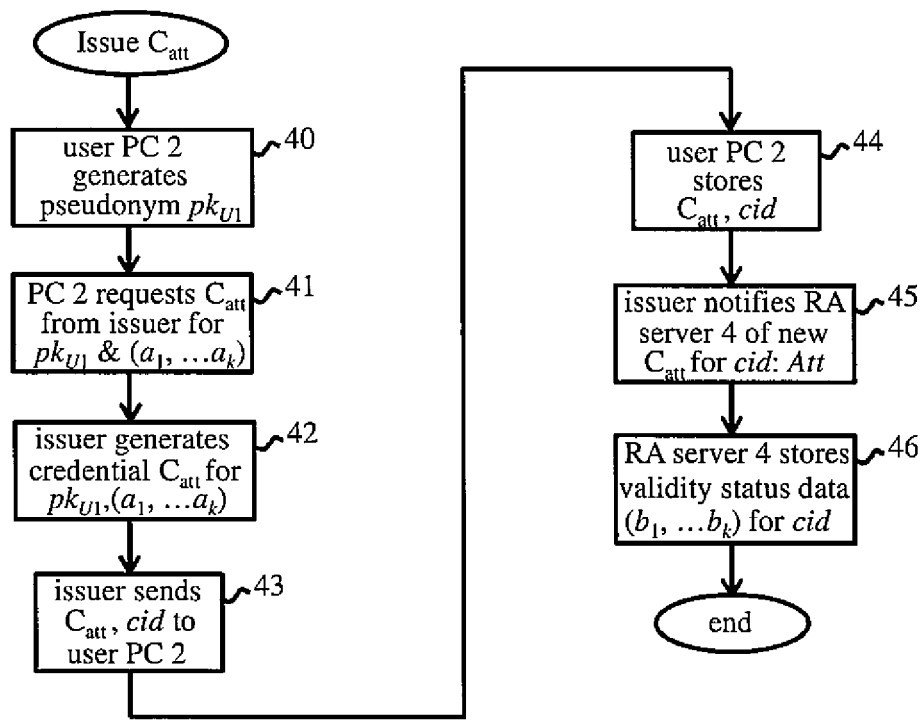
FIG. 4 indicates steps of a process for issuing an attribute credential to a user computer in one embodiment of the invention.
Figure 5:
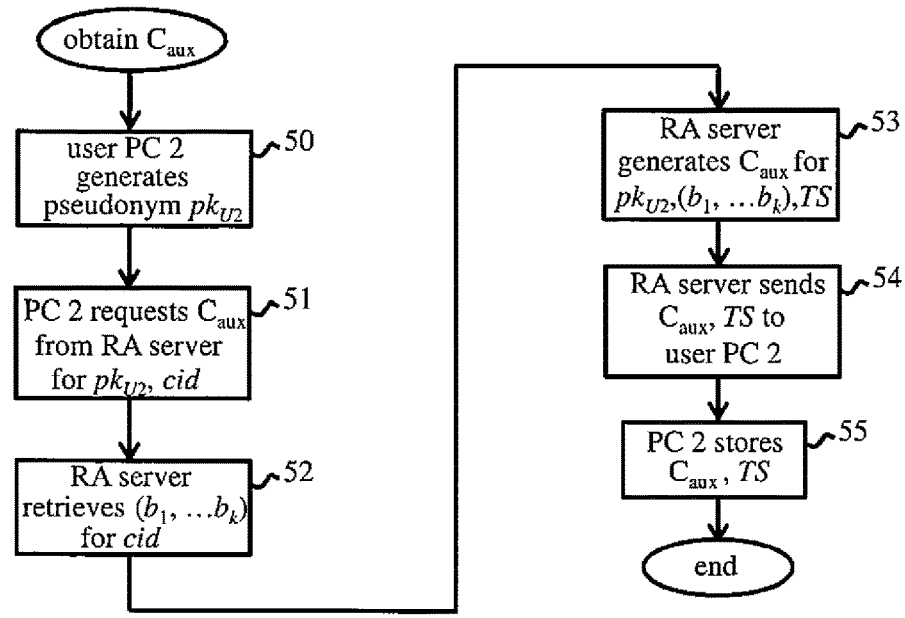
FIG. 5 indicates steps of a process for issuing an auxiliary credential to the user computer in the embodiment.

A preferred embodiment of the authorization scheme will now be described in more detail with reference to FIGS. 4 to 6. In this embodiment, user computer 2 stores a secret user key $sk_U$, and authorization logic 8 is operable to generate a plurality of cryptographic pseudonyms from this user key $sk_U$. A pseudonym is essentially a public key derived from a user's secret key $sk_U$, such that a plurality of unlinkable pseudonyms can be derived from the same secret key $sk_U$. Each pseudonym is thus bound to the same secret key $sk_U$, but the unlinkable property means that it is impossible to determine from two pseudonyms (without information about the secret key $sk_U$) whether they were derived from the same or different secret keys. FIG. 4 indicates steps of a preliminary process for this embodiment in which an attribute credential $C_{att}$ is issued to user PC 2. In this example, the attribute credential is issued electronically via communications over network 6 between PC 2 and an issuer computer (not shown in FIG. 1), e.g. a server operated by issuing authority I.

In step 40 of FIG. 4, authorization logic 8 of user PC 2 generates a first user pseudonym $pk_{U1}$ from the secret user key $sk_U$ stored in memory 9. In step 41, authorization logic 8 sends the first pseudonym $pk_{U1}$ to the issuer computer and requests issue of an attribute credential $C_{att}$ for a plurality of attributes. The attributes, denoted by $a_1, \ldots, a_k$ (k>1) in the following, are verified by the issuing authority I in any appropriate manner, and the user may supply any additional informational required for this purpose. Such procedures are well known and the details are orthogonal to the operation to be described. In step 42, the issuer computer generates an attribute credential $C_{att}$ certifying the attributes $(a_1, \ldots, a_k)$ and bound to the first user pseudonym $pk_{U1}$. In this embodiment, the credential $C_{att}$ is a privacy-preserving credential permitting zero-knowledge proofs to be made about attributes, e.g. an anonymous credential of the Identity Mixer credential system referenced above. The credential $C_{att}$ comprises a cryptographic signature $\sigma_{skI}$ under a secret issuer key $sk_I$ of a public/private key pair $(pk_I, sk_I)$, the issuer public key $pk_I$ of which is published and known to all computers 2, 3 and 4 in system 1. The credential $C_{att}$ can be bound to user pseudonym $pk_{U1}$ here by, for example, encoding $sk_U$ as an additional attribute in the credential when using the pseudonym $pk_{U1}$ as a parameter in the signature generation algorithm.

In step 43, the issuer computer sends the attribute credential $C_{att}$, together with a unique credential identifier cid for this credential, to user PC 2. In step 44, authorization logic 8 of PC 2 stores the attribute credential $C_{att}$ and identifier cid in memory 9. In step 45, the issuer notifies RA server 3 of issue of the new credential, sending the credential ID cid and an attribute specification Att which lists the attribute types (e.g. name, nationality, date of birth, etc.) certified in the credential. In step 46, the revocation logic 11 of RA server 3 then generates and stores preliminary revocation data for the new credential cid. In this embodiment, the revocation data comprises, for each attribute in the attribute specification, validity status data indicating whether that attribute is valid or invalid. In particular, the validity status data of this example comprises a binary flag $b_i$ for each attribute $a_i$, whereby the revocation data for the credential cid comprises a bit-mask $(b_1, \ldots, b_k)$. All flags $b_i$ in this bit-mask are initially set to "1" (signifying attribute=valid), for the newly-issued credential. The issue process for the credential $C_{att}$ is then complete. However, revocation logic 12 can update the validity status data for cid at any time in response to notification that an attribute is no longer valid, setting the flag $b_i$ for the revoked attribute $a_i$ to $b_i=0$ (signifying attribute=revoked) in the stored bit-mask.

To use the attribute credential $C_{att}$ for authorization, user PC 2 must first obtain an auxiliary credential $C_{aux}$ from RA server 3. FIG. 5 indicates steps of a process for obtaining the auxiliary credential $C_{aux}$ in this embodiment. In step 50 of FIG. 5, authorization logic 8 of user PC 2 generates a second user pseudonym $pk_{U2}$ from the secret user key $sk_U$ stored in memory 9. In step 51, authorization logic 8 connects to RA server 3 via network 6 to request issue of an auxiliary credential, and sends the second pseudonym $pk_{U2}$ and the credential ID cid for its attribute credential $C_{att}$. In step 52, the revocation logic 11 of RA server 3 retrieves the validity status data $(b_1, \ldots, b_k)$ for cid from memory 12. In step 53, the revocation logic 11 generates an auxiliary credential $C_{aux}$ bound to the second user pseudonym $pk_{U2}$. In this example, the auxiliary credential $C_{aux}$ certifies the validity status data $(b_1, \ldots, b_k)$ and a timestamp TS. The timestamp TS indicates an expiry time of the auxiliary credential, and may be set to expiry of a predetermined time interval after issue of the credential. The credential $C_{aux}$ is again a privacy-preserving credential as described above, and comprises a cryptographic signature $\sigma_{skRA}$ under a secret revocation authority key $sk_{RA}$ of a public/private key pair $(pk_{RA}, sk_{RA})$, the public key $pk_{RA}$ of which is known to all other computers 2, 4 in system 1. The credential $C_{aux}$ can be bound to user pseudonym $pk_{U2}$ here as previously described for the credential $C_{att}$. Since the user pseudonyms $pk_{U1}$ and $pk_{U2}$ in the two credentials are bound to the same secret user key $sk_U$, the auxiliary credential $C_{aux}$ is thereby bound to the attribute credential $C_{att}$ for cid via the secret user key $sk_U$.

In step 54, the revocation logic 11 of RA server 3 sends the auxiliary credential $C_{aux}$ to user PC 2 together with the timestamp TS encoded in the credential. In step 55, the authorization logic 8 of PC 2 stores the auxiliary credential $C_{aux}$ and timestamp TS in memory 9, and the process is complete.

Figure 6:
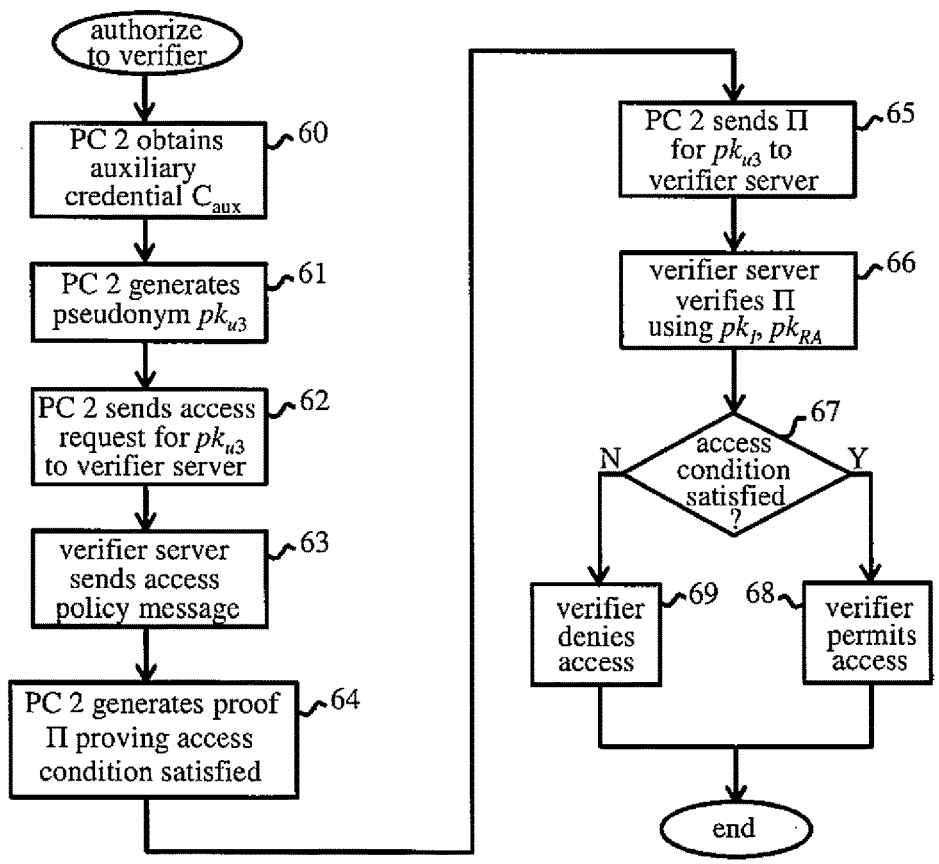
FIG. 6 indicates steps of a process for authorizing the user computer to a verifier computer in the embodiment.

FIG. 6 indicates steps of the authorization process in this embodiment whereby user PC 2 demonstrates authorization to access database 7 to verifier server 4. This process requires possession by user PC 2 of the attribute credential $C_{att}$ and also a current (unexpired) auxiliary credential $C_{aux}$. Hence, in step 60, authorization logic 8 of user PC 2 obtains an auxiliary credential via the FIG. 5 process if required, i.e. if no auxiliary credential has previously been obtained or if the expiry timestamp TS of a currently-stored auxiliary credential has expired. In step 61, authorization logic 8 generates a third user pseudonym $pk_{U3}$ from the secret user key $sk_U$ stored in memory 9. In step 62, authorization logic 8 sends an access request containing the third pseudonym $pk_{U3}$ to verifier server 4. In step 63, verification logic 14 of verifier server 4 responds by sending an access policy message to user PC 2. This access policy message indicates the access condition for database 5. Such an access condition may specify one or more requirements relating to one or more attributes which are necessary for authorization. Such a requirement may for instance, require a given attribute type to have a certain value (e.g. professional role=supervisor), or that an attribute (e.g. date of birth) satisfies a range requirement (e.g. age >18). In general, however, any requirement or combination of requirements can be specified in the access condition here.

In step 64, the authorization logic 8 of user PC 2 generates a non-interactive, zero-knowledge proof Π demonstrating that at least one attribute in the attribute credential $C_{att}$ is certified as valid by the auxiliary credential $C_{aux}$ and satisfies the access condition defined in the policy message. In particular, the proof HI proves: knowledge of an authentic attribute credential $C_{att}$ certifying attribute(s) which satisfy the requirement(s) specified in the access condition; and knowledge of an authentic auxiliary credential $C_{aux}$ which certifies that the attribute(s) in question are valid. In this example, overall validity is demonstrated by proving that: the auxiliary credential $C_{aux}$ is bound to the attribute credential $C_{att}$ via a secret key $sk_U$ known to authorization logic 8; that the validity status flag in the auxiliary credential is $b_i=1$ for each required attribute; and that the auxiliary credential timestamp TS is greater than a current time, and hence that the auxiliary credential has not yet expired. Binding of the credentials $C_{att}$ and $C_{aux}$ can be demonstrated here by proving that the two credentials are bound to the same secret key $sk_U$ as the third user pseudonym $pk_{U3}$ presented for verification. Authenticity of the credentials $C_{att}$ and $C_{aux}$ can be demonstrated via the issuer and revocation authority public keys $pk_I, pk_{RA}$ which are known to all parties in the system. The proof Π can be generated using known cryptographic proof protocols, and the protocol details will depend on the particular credential scheme underlying the authorization system. Suitable proof protocols for a given credential scheme will be apparent to those skilled in the art.

In step 65, the authentication logic sends the proof Π for pseudonym $pk_{U3}$ to verifier server 4. In step 66, the verification logic 14 of server 4 uses the public keys $pk_I, pk_{RA}$ of the issuing and revocation authorities to verify the proof Π, and hence to determine in decision step 67 whether the access condition is satisfied. If so, the verifier server 4 permits access to database 5 in step 68. If not, access is denied in step 69, and the authorization process terminates.

In the authorization system of this embodiment, the authorization logic 8 of user PC 2 must periodically communicate with the RA server 3 to obtain an auxiliary credential. This step may be performed automatically whenever the timestamp TS of a current credential expires, or whenever an authorization process is initiated after the timestamp TS has expired. This ensures that changes in the validity status data $b_i$ due to revocation of attributes are regularly propagated to auxiliary credentials. Revocation can be implemented with attribute granularity, allowing continued use of attribute credentials with any remaining valid attributes. The validity status bit-mask $(b_1, \ldots, b_k)$ can be encoded as a single attribute in the auxiliary credential, allowing this approach to be realized very efficiently even in anonymous and other privacy-preserving credential systems. The use of such credentials in the above embodiment allows privacy-preserving, data-minimized proofs Π based on these credentials, whereby different verification processes of the same user are unlinkable, and no more information is revealed about credentials/attributes than is necessary to satisfy an access condition. Operation of the system can be made transparent to users and verifiers of existing authorization systems, operational differences being fully encapsulated in functionality of the authorization logic 8 and verification logic 14 of the user and verifier computers.

In a modification to the above embodiment, the validity status data for an attribute $a_i$ could be an attribute timestamp $ts_i$ corresponding to a revocation date for the attribute. The timestamp $ts_i$ could be a date in the remote future or could be unspecified for persistent attributes (e.g. date-of-birth). Overall validity status of attributes may be indicated by this validity status data alone or by this data in combination with an auxiliary credential timestamp TS. In another modification, the auxiliary credential timestamp TS could specify an issue time of the auxiliary credential, allowing verifiers to specify their own requirements as to how recently the auxiliary credential must have been issued for successful authorization. Some verifiers, for instance, may require the credential to be based on very recent revocation information, e.g. an issue timestamp TS not older than one hour. Such a requirement could be specified in access policy messages sent to user computers 2, and the authentication logic 8 may then obtain a fresh auxiliary credential where required. In another interesting modification, the validity status data for each attribute $a_i$ could indicate a corresponding issue date $t_i$ and a revocation date $t_i'$ (where the revocation date may be unspecified or in the remote future for persistent attributes). In addition to attribute revocation, this approach offers a "time-machine" feature for attributes, allowing proofs to be made that an attribute was valid in a certain time-frame.

Numerous other changes and modifications can of course be made to the embodiments described. The auxiliary credentials could be bound in other ways to the attribute credential, for example by encoding a credential ID in both credentials. In the case of X.509 certificates, for instance, the serial number of the attribute credential could be referenced in the auxiliary credential. Instead of using an expiry timestamp TS for auxiliary credentials, expiry could be enforced by periodically changing the revocation authority public key $pk_{RA}$ supplied to verifiers, whereby auxiliary credential signatures have limited validity determined by validity of the current public key $pk_{RA}$. Proofs based on auxiliary credentials issued under an old revocation authority key-pair $(pk_{RA}, sk_{RA})$ will therefore fail verification by verifiers using a new key $pk'_{RA}$.

In some embodiments, the process for issuing auxiliary credentials to users may require a user to send the attribute credential to the revocation authority computer, and/or may involve interaction between the revocation authority and issuing authority I, e.g. to obtain some parameter(s) to be used in generation of the auxiliary credential. In other embodiments, auxiliary credentials may be issued automatically by RA computer 3, e.g. periodically, and made available to user computers, e.g. via email or download from a web-site. In general, therefore, the communication via which a user computer obtains an auxiliary credential may be prompted by action of the revocation authority computer and/or the user computer. Where auxiliary credentials are obtained periodically by user computers, this may occur at regular or irregular intervals and may be prompted by expiry of some time period, e.g. a timestamp, and/or by rejection of an auxiliary credential in an authorization process.

While operation has been described for an exemplary computer system 1, various other computer systems can be envisaged. For example, the revocation authority and verifier computers 3, 4 may be implemented by computing apparatus comprising one or more general- or special-purpose computing devices, each comprising one or more (real or virtual) machines, providing functionality for implementing the operations described. Such computing apparatus may be practiced in distributed cloud computing environments where tasks are performed by remote processing devices that are linked through a communications network. User computer 2 may alternatively comprise a mobile phone, palmtop device, tablet computer, personal music player or other computing device. In some embodiments, credentials and/or secret user keys may be stored on a trusted storage device such as a smart card or chip, e.g. a TPM (trusted platform module) or SHM (secure hardware module) which may be operatively coupled to a user computer.

Cryptographic processing operations in steps described above may be wholly or partially performed by a dedicated processor of such a device.

While exemplary credential systems are referred above, in general the authorization process described can be implemented with any attribute-based credential system. The syntax and semantics of the revocation data stored by the RA computer can be adapted as required for a particular application.

The verifier-controlled resource 5 may comprise any resource to which user access is restricted, e.g. an application, service, data, device, network or any other facility or combination of facilities.

Steps of flow diagrams may be performed in a different order to that shown, and some steps may be performed concurrently as appropriate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising, at a user computer:
   storing an attribute credential certifying a set of attributes, the set of attributes being a plurality of attributes;
   communicating with a revocation authority computer to obtain an auxiliary credential, cryptographically bound to said attribute credential, certifying a validity status for each attribute in the attribute credential, wherein said auxiliary credential certifies, for each attribute of the plurality of attributes, validity status data indicating whether that attribute is valid or invalid, and wherein, through use of the auxiliary credential, attributes in the attribute credential can be revoked individually, leaving others still valid, without requiring re-issue of the attribute credential as a whole;
   communicating with a verifier computer to prove possession of said attribute credential and said auxiliary credential such that the verifier computer is configured to determine whether at least one attribute in the attribute credential, certified as valid by the auxiliary credential, satisfies an access condition for a resource; and
   accessing the resource in response to the verifier computer permitting access to the resource.

2. A method as claimed in claim 1 wherein the step of communicating with the verifier computer includes:
   receiving from the verifier computer an access policy message indicating said access condition; and
   proving to the verifier computer that at least one attribute in the attribute credential is certified as valid by the auxiliary credential and satisfies said access condition.

3. A method as claimed in claim 2 including, at the user computer:
   generating a cryptographic proof demonstrating that at least one attribute in the attribute credential is certified as valid by the auxiliary credential and satisfies said access condition; and
   sending the cryptographic proof to the verifier computer.

4. A method as claimed in claim 1 including, at the user computer, periodically communicating with the revocation authority computer to obtain said auxiliary credential.

5. A method as claimed in claim 1, wherein the user computer proves possession of said attribute credential to the verifier computer in response to at least one attribute in the attribute credential being certified as invalid by the auxiliary credential.

6. The method of claim 1, wherein the auxiliary credential is cryptographically bound to the attribute credential such that the auxiliary credential can only be validly used with the corresponding attribute credential.

7. A computer program product comprising a computer readable storage medium having program instructions embodied therein, the program instructions being executable by a user computer storing an attribute credential, certifying a set of attributes, the set of attributes being a plurality of attributes, to cause the user computer to:
   communicate with a revocation authority computer to obtain an auxiliary credential, cryptographically bound to said attribute credential, certifying a validity status for each attribute in the attribute credential, wherein said auxiliary credential certifies, for each attribute of the plurality of attributes, validity status data indicating whether that attribute is valid or invalid, and wherein, through use of the auxiliary credential, attributes in the attribute credential can be revoked individually, leaving others still valid, without requiring re-issue of the attribute credential as a whole;
   communicate with a verifier computer to prove possession of said attribute credential and said auxiliary credential such that the verifier computer is configured to determine whether at least one attribute in the attribute credential, certified as valid by the auxiliary credential, satisfies an access condition for a resource; and
   accessing the resource in response to the verifier computer permitting access to the resource.

8. A computer program product as claimed in claim 7 wherein said program instructions are executable by the user computer to cause the user computer, in response to receipt from the verifier computer of an access policy message indicating said access condition, to prove to the verifier computer that at least one attribute in the attribute credential is certified as valid by the auxiliary credential and satisfies said access condition.

9. A computer program product as claimed in claim 8 wherein said program instructions are executable by the user computer to cause the user computer to:
   generate a cryptographic proof demonstrating that at least one attribute in the attribute credential is certified as valid by the auxiliary credential and satisfies said access condition; and
   send the cryptographic proof to the verifier computer.

10. A computer program product as claimed in claim 7 wherein said program instructions are executable by the user computer to cause the user computer to periodically communicate with the revocation authority computer to obtain said auxiliary credential.

11. A computer program product as claimed in claim 7, wherein said program instructions are executable by the user computer to cause the user computer to prove possession of said attribute credential to the verifier computer in response to at least one attribute in the attribute credential being certified as invalid by the auxiliary credential.

12. A computer program product as claimed in claim 7, wherein the auxiliary credential is cryptographically bound to the attribute credential such that the auxiliary credential can only be validly used with the corresponding attribute credential.

13. A computer system comprising:
a memory having computer program code; and
at least one processor, wherein the at least one processor, in response to retrieval and execution of the computer program code, causes the computer system to perform operations comprising:
storing an attribute credential certifying a set of attributes, the set of attributes being a plurality of attributes;
communicating with a revocation authority computer to obtain an auxiliary credential, cryptographically bound to said attribute credential, certifying a validity status for each attribute in the attribute credential, wherein said auxiliary credential certifies, for each attribute of the plurality of attributes, validity status data indicating whether that attribute is valid or invalid, and wherein, through use of the auxiliary credential, attributes in the attribute credential can be revoked individually, leaving others still valid, without requiring re-issue of the attribute credential as a whole;
communicating with a verifier computer to prove possession of said attribute credential and said auxiliary credential such that the verifier computer is configured to determine whether at least one attribute in the attribute credential, certified as valid by the auxiliary credential, satisfies an access condition for the resource; and
accessing the resource in response to the verifier computer permitting access to the resource.

14. An apparatus as claimed in claim 13 wherein the communicating with the verifier computer includes:
receiving from the verifier computer an access policy message indicating said access condition; and
proving to the verifier computer that at least one attribute in the attribute credential is certified as valid by the auxiliary credential and satisfies said access condition.

15. An apparatus as claimed in claim 14 wherein the at least one processor, in response to retrieval and execution of the computer program code, causes the computer system to perform operations comprising:
generating a cryptographic proof demonstrating that at least one attribute in the attribute credential is certified as valid by the auxiliary credential and satisfies said access condition; and
sending the cryptographic proof to the verifier computer.

16. An apparatus as claimed in claim 13 wherein the at least one processor, in response to retrieval and execution of the computer program code, causes the computer system to perform operations comprising: periodically communicating with the revocation authority computer to obtain said auxiliary credential.

17. An apparatus as claimed in claim 13 wherein the at least one processor, in response to retrieval and execution of the computer program code, causes the computer system to perform operations comprising: proving possession of said attribute credential to the verifier computer in response to at least one attribute in the attribute credential being certified as invalid by the auxiliary credential.

18. An apparatus as claimed in claim 13 wherein the auxiliary credential is cryptographically bound to the attribute credential such that the auxiliary credential can only be validly used with the corresponding attribute credential.

* * * * *